United States Patent [19]

Malik et al.

[11] Patent Number: 5,740,237
[45] Date of Patent: Apr. 14, 1998

[54] METHOD AND SYSTEM FOR A SINGULAR ACTIVATION OF A REDIRECTION SERVICE WITHOUT GENERAL ACTIVATION OF THE SERVICE

[75] Inventors: Dale Malik, Dunwoody; Robert Koch, Norcross, both of Ga.

[73] Assignee: BellSouth Corporation, Atlanta, Ga.

[21] Appl. No.: 527,855

[22] Filed: Sep. 14, 1995

[51] Int. Cl.$^6$ .................................................. H04M 3/54
[52] U.S. Cl. ...................... 379/211; 379/201; 379/207; 379/212; 379/220
[58] Field of Search .................... 379/211, 219, 379/220, 221, 207, 212, 201, 210, 188, 196, 93

[56] References Cited

U.S. PATENT DOCUMENTS

| | | | |
|---|---|---|---|
| 5,329,578 | 7/1994 | Brennan et al. | 379/201 |
| 5,432,845 | 7/1995 | Burd et al. | 379/210 |
| 5,467,388 | 11/1995 | Redd, Jr. et al. | 379/211 |
| 5,485,511 | 1/1996 | Iglehart et al. | 379/201 |
| 5,530,931 | 6/1996 | Cook-Helberg et al. | 379/211 |
| 5,548,636 | 8/1996 | Bannister et al. | 379/211 |
| 5,553,128 | 9/1996 | Grimes | 379/211 |
| 5,583,564 | 12/1996 | Rao et al. | 379/210 |
| 5,590,186 | 12/1996 | Liao et al. | 379/211 |

OTHER PUBLICATIONS

CrisisLink Service Question & Answer Booklet, "Protecting Your Connection to the World When you Need it the Most", BellSouth Business Systems, pp. 1–9, undated.

*Primary Examiner*—Krista Zele
*Assistant Examiner*—Scott Wolinsky
*Attorney, Agent, or Firm*—Jones & Askew, LLP

[57] ABSTRACT

In an intelligent switched telephone network wherein a network communication redirection service is selectively activated with respect to all communications directed to a directory number to direct communications pursuant to a subscriber preselected redirection scheme, a method and system for a singular activation of the network communication redirection service with respect to a particular communication only. The singular activation of the service for a particular communication is useful in testing the network communication redirection service or redirection scheme. To singularly activate the service for a particular communication, a communication is placed to a selected directory number on a calling line having a predetermined calling line identification number. The communication is received in the network and has its identification information read for the calling line identification number. The calling line identification number is compared for a corresponding entry in a database of subscriber information. If a corresponding entry is found, then the network communication redirection service is singularly activated only for that communication and the communication is routed pursuant to a subscriber preselected redirection scheme. If no corresponding entry is found, then the communication is routed to the directory number.

11 Claims, 4 Drawing Sheets

METHOD AND SYSTEM FOR A SINGULAR ACTIVATION OF A REDIRECTION SERVICE WITHOUT GENERAL ACTIVATION OF THE SERVICE

TECHNICAL FIELD

The present invention generally relates to telecommunications systems, and more particularly, relates to a method and system for a singular activation of a network communication redirection service for a particular communication without generally activating the service for other communications.

BACKGROUND OF THE INVENTION

To state the obvious, today's business relies heavily on communication services. Any serious disruption to the communication services of a business generally has a serious, negative impact on that business. In fact, many businesses, especially small businesses, including financial institutions and stock and bond brokers, would simply be out-of-business if there were any serious disruptions to their communication services. Similarly, our educational, health and social institutions would suffer in many ways as a result of any serious disruption to their communication services. The dependence on communication services reaches into the home as well. An inability to quickly get in touch with a family member or friend in case of emergency or for any other reason is simply unacceptable to many people.

Serious disruptions to communication services are relatively rare, but they do occur on all scales. Examples of grand scale communication disruptions include natural disasters such as hurricanes, tornadoes, floods, blizzards, ice storms, earthquakes and forest fires, and include man-made disasters such as wars, police actions, riots, and civil unrest. Examples of smaller scale communication disruptions include lesser scale disasters such as localized power outages, brown outs, and other such events. Of course, communication services to a particular home, business, church or school may be disrupted by an isolated event such as a fire, power outage, gas leak, or flooding that has plagued that particular location. Everybody within the disaster area (whether it be on a grand, small or isolated scale) will suffer some communication service disruption as a result of the disaster. Particularly hardhit by a disruption to communication services will be the aforementioned small businesses including financial institutions such as banks and stock brokers that literally rely on the exchange of information as their business. Also hardhit by a communication service disruption will be sales and service organizations that rely on telephones, fax machines or networked computers for sales and service calls. In particular, a business that relies on calls to an "800" or "900" number will especially suffer. Further, during a communication service disruption, service organizations such as local police, fire and medical facilities ("911 services") and emergency relief organizations such as the American Red Cross will be hampered and the people they serve will suffer delays and the consequences of such delays.

In addition, human nature and human foibles being what they are, communication services may be disrupted as a result of actions or the lack of actions on the part of the resources that interact with the communication services. Let's take the example of a grocery store chain. In this example, each grocery store in the chain takes delivery orders over the telephone. If the communication services to the grocery stores are set up such that each store has its own directory number for delivery orders, then each store must staff the telephone in the store associated with the directory number. If one of the stores has a problem with staffing the telephone, then the communication service to that store is effectively disrupted. Staffing problems are myriad and include staff scheduling problems, vacation or holiday periods, staff absence because of illness or injury, and employment walk-outs or strikes. Generally stated, such staffing problems fall within the purview of resource management and load balancing with respect to the communication duties that must be performed to maintain the operations of the business, social or educational institution.

To insure that the proverbial and literal lines of communication remain open, many businesses and other social, health and educational institutions subscribe to one of several different types of communication redirection services. The simplest of these services is commonly known as "call forwarding". Call forwarding services are used extensively by small businesses and people who work at home. Such call forwarding services are particularly useful in business emergency situations, where the sole proprietor must be mobile.

One network communication redirection service that has been developed to handle the complicated communication requirements of a business in an emergency is the CRISISLINK service offered by BellSouth Telecommunications, Inc., Atlanta, Ga., assignee of the present application. The CRISISLINK service is explained in greater detail in the related application Ser. No. 08/511,743, filed Aug. 7, 1995, entitled "A Method and System to Bypass Alternate Routing Plans Applied to Directory Numbers", and assigned to the assignee of the present application.

The CRISISLINK service is a network-based communication redirection service. The terms "network" or "network-based" refer to the fact that the service is implemented through devices such as service switching points, service control points, and service nodes comprising the backbone of the telecommunications network rather than through any stand-alone devices such as customer premises equipment, etc. The CRISISLINK service allows a subscriber to preselect a redirection scheme for calls. The subscriber preselected redirection scheme provides the subscriber with a host of options. The subscriber may specify that a selectable percentage of calls during an emergency or during specified times be redirected from specified directory numbers to one or more alternate ("backup") numbers previously selected by the subscriber. The subscriber may choose to have all calls to the directory number or numbers redirected to a particular backup number, or have a selectable percentage of the calls spread amongst two or three backup numbers. The ability to distribute the calls amongst one or more backup numbers provides the CRISISLINK subscriber with greater flexibility in handling emergencies or other events that may cause a disruption to communication services at the location associated with the directory number.

The CRISISLINK service also provides its subscribers with the option of having all calls receive a preselected announcement instead of being redirected, or of having a selectable percentage of the calls receive a preselected announcement with the remaining percentage of calls being redirected to one or more backup numbers. Further, the CRISISLINK service allows the subscriber to choose to redirect or provide an announcement to only a percentage of the calls that are directed to the directory number while the remaining percentage are directed as dialed to the directory number. In addition, the CRISISLINK service allows the subscriber to change the percentage of call redirection as the situation develops. In sum, a subscriber of CRISISLINK service has greater flexibility in handling emergencies or other events that may cause a disruption to communication services at the location associated with the directory number because of the following features provided by the service: the ability to leave a selectable percentage of calls with the dialed directory number; the ability to provide an announcement to a selectable percentage of the calls; and the ability to distribute the calls amongst one or more locations.

The CRISISLINK service advantageously operates in a fashion transparent to customers within the Advanced Intelligent Network (AIN), an intelligent switched telephone network used by BellSouth Telecommunications, Inc. Also, as a network-based service, the CRISISLINK service advantageously operates with all types of telephone and communications services including multiline hunt groups, direct-inward-dial (DID) lines, ESSX service, the ISDN Primary Rate Interface, as well as with POTS (Plain Old Telephone Service), and any type of facilities access. The CRISISLINK service is independent of facilities access because it intercepts the communication as it enters the network for local routing.

As noted above, many businesses, educational, health and social institutions, and individuals have come to rely on communication redirection services such as the CRISISLINK service for continuity in communication services. A redirection service such as the CRISISLINK service is generally implemented to redirect communications pursuant to the subscriber preselected redirection scheme in one of two situations: (1) an emergency situation that causes the redirection service to be automatically turned "ON"; or (2) the subscriber's instruction that causes the redirection service to be turned "ON". An emergency situation may include any of the grand, small or isolated emergencies described above and other such situations. In the case of such an emergency, the redirection service is programmed to turn "ON", and redirect communications pursuant to the subscriber preselected redirection scheme. The redirection service also may be turned "ON" at the instruction of the subscriber when the subscriber believes it is desirable to redirect communications. For example, a subscriber may turn "ON" the redirection service to redirect calls pursuant to a preselected scheme in anticipation of a flood of calls to the directory number, as a result of a flu epidemic at the site associated with the directory number, or for any of a host of other reasons.

Once the redirection service is implemented, whether in an emergency situation or at the instigation of the subscriber, then all communications directed to the subscriber's directory number or numbers are handled pursuant to the subscriber preselected redirection scheme. In other words, activation or implementation of the redirection service is an "ON-or-OFF" proposition.

The "ON-or-OFF" activation of a communication redirection service such as the CRISISLINK service poses a major problem for a subscriber. The problem is that the subscriber is unable to test the redirection service without complete activation of the service. Testing the redirection service is imperative to confirm that the service will work for its intended purpose. It is important to test the redirection scheme and service in order to insure all information in the subscriber's redirection scheme and internal resources are aligned properly. Over time, subscriber's resources change along with locations and telephone numbers. Being able to execute a redirection service on a regular basis would be ideal. However, execution of a redirection service resource intensive, impractical and potentially dangerous when performed often. Having a method and system that does not require all of the resources to be in place and notified specially could allow an automated process to take place. In these days of interactive voice response systems, it is easy to see that a test of a redirection service could be activated by one of these systems interactive voice response to reach all back-up sites, prompt the respondents for entry, and log the results for validation.

However, testing the redirection service by its complete activation has several pitfalls. One such pitfall is the likely disruption to the subscriber's communications and subscriber's business as a result of the complete activation of the redirection service. This redirection of all of the calls, even for a relatively short period of time, may negatively impact the subscriber's business and/or cause the misdirection of information. With respect to a business, business opportunities may be lost, customers discouraged, sales missed, service calls misdirected, etc. With respect to resource management problems, testing of a redirection service by its full activation may exacerbate the problems at the site associated with the directory number or at the backup locations. For example, if calls are redirected away from a problem office for a test of the redirection service, then the backup locations must be ready to accept such calls and must be staffed with their complements of sales associates, staff, etc. If the chronic understaffing of a problem office has led to the communications disruption, then even the test redirection of calls to ill-prepared backup locations may only further depress sales associate morale, disappoint (or even offend) customers who cannot reach the problem office, and overburden management. Customers or clients calling the subscriber will be redirected and they may react negatively to the redirection, or be alarmed that some emergency in fact exists.

Another pitfall to testing the redirection service by its full activation is the complicated process that the subscriber may have to follow in order to execute the test of the redirection service. To test whether the redirection service will operate in an emergency, the subscriber may have to take certain preparatory steps before the test can begin. First, the subscriber may have to alert its own employees and staff that such a test will occur and that as a result certain communication disruptions may occur. Second, the subscriber may have to alert its backup locations to let the staff at the backup locations know that a test is about to occur and that communications will be redirected to them. This second step may be a particularly onerous step for those that do not typically fully equip or staff backup locations. For example, a subscriber may plan to activate a redirection service only in an emergency, and thus, the subscriber may not adequately equip or staff backup locations on a regular basis. In other words, the backup locations may not be equipped or staffed sufficiently to handle the subscriber's conventional communication traffic. Calls may be missed, business may be lost. Third, the subscriber may have to alert customers or frequent callers that a test will occur and that certain communication disruptions may occur. This information may not be appreciated or accepted by certain customers. They may take their business elsewhere. At the conclusion of the test, the subscriber may have to repeat these steps to provide information that the test has been concluded. If the test is unsuccessful, the same or similar testing steps may have to be repeated. If the subscriber adopts a new or different redirection scheme for communications in emergencies, the subscriber may have to test and retest the new or different redirection schemes until at least one scheme tests to the subscriber's satisfaction.

To highlight the pitfalls in testing a redirection service by its full activation, we used the relatively simple example above of a subscriber who chooses that such a service be implemented only in case of an emergency. As noted above in the discussion of redirection services generally, there are subscribers who choose to activate redirection services in more than just emergency situations. For example, a subscriber may choose to activate a redirection service in any of the following situations: staffing problems at one or more of its locations; overflow or underflow of calls to a particular directory number or numbers; equipment problems at a particular location; computer backup procedures; and/or special events. To accommodate these situations, the subscriber has the option under certain redirection services such as the CRISISLINK service to preselect a relatively more complicated redirection scheme than may be used in emergency situations. Further, the subscriber may change these more complicated redirection schemes more often than simpler schemes as a result of a change in the particular situation, or even to change the redirection schemes on-the-fly as the situation develops, improves or deteriorates. For a subscriber with more complicated redirection schemes or dynamically changing redirection schemes, the problems of testing the redirection service by its complete activation are further exacerbated.

For example, a subscriber may have preselected a redirection scheme that is a relatively complicated redirection scheme and that needs to be tested to make sure that it suits the subscriber's purposes. In the following example, the subscriber has preselected a redirection scheme that provides that calls are spread amongst the directory number, a preselected announcement and three backup numbers according to the following percentages:

10% of the calls are directed to the directory number
10% of the calls receive a preselected announcement
20% of the calls redirected to backup #1
30% of the calls redirected to backup #2
30% of the calls redirected to backup #3

To check out the effectiveness of this redirection scheme, the subscriber must activate the redirection service, and once activated, all calls are redirected pursuant to the scheme. If the scheme is inadequate or if it needs some "tweaking", the subscriber will find out such results only in a "live" situation with real customers or clients as the guinea pigs. Such "live" experimentation may have a negative impact on the subscriber's business if there are problems with the redirection scheme preselected by the subscriber.

Further, to test this redirection scheme by the full activation of the redirection service, the subscriber will have to take certain preparatory steps before the test can begin. First, the subscriber may have to alert its own employees and staff that such a test will occur and that as a result certain communication disruptions may occur. In this example, the communications that will be received at the site associated with the directory number will be reduced by 90%. Only 10% of the calls dialed to the directory number will reach the directory number. Thus, employees at the site associated with the directory number may have to reschedule their work, provide for other means of communication, or take other measures to accommodate the reduction in the number of communications that will get through to the site associated with the directory number.

Second, the subscriber may have to alert all three of the backup locations to let the staff at the backup locations know that a test is about to occur and that a certain percentage of communications will be redirected to them. These backup locations will have to be properly equipped and staffed, or the risk in the loss of the business associated with the calls redirected to the backup locations will increase.

Third, the subscriber will have to prepare an announcement for the 10% of the calls that are to be redirected to the announcement. Preferably, the announcement will advise the callers that a test is taking place and that the subscriber's communication services will be back on-line within a relatively short period of time. This test message may put off some customers who may take their business elsewhere. Once the test is over, the subscriber will have to change the announcement to something else that will be used when the redirection services are implemented in a situation other than a test situation. The creation, recording, and substitution of the messages take time and effort on the part of the subscriber.

Fourth, the subscriber may have to advise certain customers and regular or frequent callers that a test of the redirection service will occur and that certain communication disruptions may occur. This information may not be appreciated by certain customers. At the conclusion of the test, the subscriber may have to repeat the above described steps to provide information to employees, staff at the backup site and/or customers or frequent callers that the test has been concluded. If the test is unsuccessful, the same or similar test steps may have to be repeated. If the subscriber adopts a new or different redirection scheme for communications, the subscriber may have to test and retest the new or different redirection schemes until at least one scheme tests to the subscriber's satisfaction.

Accordingly, there is a need in the art for the capability of singular activation of a redirection service without general activation of the service. In addition, there is a need in the art for the capability of such singular activation of a redirection service for the purpose of testing the redirection service and the subscriber preselected redirection scheme. Further, there is a need in the art for the capability of such singular activation of a redirection service so as to minimally disrupt the communication services of the subscriber. Also, there is a need in the art for such singular activation of a redirection service that is relatively inexpensive, that does not require on-premises equipment, that is easy to use, and that is easy to maintain and service.

SUMMARY OF THE INVENTION

As will be seen, the present invention satisfies the foregoing criteria. Stated generally, the method and system of the present invention allow a network communication redirection service to be singularly activated with respect to a particular communication without generally activating the service for other communications. Advantageously, the singular activation of the redirection service with respect to a particular communication allows the subscriber to test the redirection service and/or the subscriber preselected redirection scheme associated with the redirection service without disrupting the subscriber's other communications.

Stated more particularly, the present invention operates in connection with an intelligent switched telephone network wherein a network communication redirection service is selectively activated with respect to all communications to redirect communications that are initially directed to a directory number pursuant to a subscriber preselected redirection scheme. The method of the present invention receives a communication. The communication is initially directed to the directory number to which the redirection service is applied. The present invention reads the identification information associated with the communication for a calling line identification number. A search for a corresponding entry to the calling line identification number is conducted in a database of subscriber records maintained by the network. If a corresponding entry exists, this indicates a request for the singular activation of the network communication redirection service. In response to finding a corresponding entry to the calling line identification number, the network communication redirection service is activated for that communication only by routing the communication pursuant to the subscriber preselected redirection scheme. In response to failing to find the corresponding entry, then the communication is routed to the directory number. The lack of a corresponding entry indicates the lack of a request for the singular activation of the network redirection service.

Stated even more particularly with respect to the preferred method and system of the present invention, the present invention includes a switch which is operative to receive a communication in the intelligent switched telephone network. The communication is directed to the directory number to which the network communication redirection service has been applied by network elements such as the switch and a service control point. The switch reads the identification information associated with the communication and provides the identification information to a service control point that is functionally connected to the switch. In addition, the service control point includes a database of subscriber records (also referred to as subscriber information) maintained by the network. The service control point reads the identification information for the presence of a directory number (also referred to as a called party identification number). The service control point searches for a matching entry to the directory number in the database of subscriber records.

In response to finding the matching entry to the directory number, the service control point searches for a corresponding entry to the calling line identification number in the database of subscriber records. Finding a corresponding entry to the calling line identification number indicates a request for the singular activation of the network communication redirection service for that particular communication. Upon finding such a corresponding entry, the service control point implements the network communication redirection service by providing the switch with redirection routing instructions to route the communication pursuant to the subscriber preselected redirection scheme. In response to receiving the redirection routing instructions, the switch routes the communication pursuant to the subscriber preselected redirection scheme. In response to failing to find a corresponding entry to the calling line identification number, the service control point provides the switch with conventional routing instructions so as to route the communication to the directory number. In response to receiving the conventional routing instructions, the switch routes the communication to the directory number.

In the preferred embodiment, the present invention is used in conjunction with a network communication redirection service, and in particular, may be used in conjunction with a redirection service having a feature known as a test call capability available to subscribers. As used herein, a test call capability feature of a redirection service allows a subscriber to bypass a redirection service that has been applied to a directory number and to be connected to the dialed directory number. When implemented with a test call capability feature, the preferred method and system of the present invention do not differ from the descriptions above. However, when the present invention is combined with the test call capability feature, the combination results in the following steps and system described below following upon the steps and system of the present invention described above.

After the service control point fails to find a corresponding entry to the calling line identification number, the present invention generally checks whether the redirection service for the directory number has been turned on. In particular, if the service control point fails to find a corresponding entry for the calling line identification number in the identification information associated with the communication, the service control point checks whether the network communication redirection service has been implemented with respect to the directory number associated with the communication. If the network communication redirection service has not been implemented, then the service control point provides the switch with conventional routing instructions to route the communication to the directory number and the switch responds to the conventional routing instructions by routing the communication to the directory number.

On the other hand, if the service control point finds that the network communication redirection service has been implemented, then the service control point preferably checks whether the subscriber has the test call capability feature. In particular, the service control point reads the database of subscriber information for a bypass feature. The bypass feature indicates the availability of an option of bypassing the network communication redirection service and having the communication routed to the directory number. If the service control point does not find the bypass feature, then the service control point provides the switch with redirection routing instructions to route the communication pursuant to the subscriber preselected redirection scheme, and the switch responds to the redirection routing instructions by routing the communication pursuant to the subscriber preselected redirection scheme.

If the service control point finds the bypass feature, then the service control point preferably proceeds with steps to check whether the caller desires to implement the test call capability feature. In particular, the service control point preferably provides the switch with password collection instructions. The switch preferably responds to the password collection instructions from the service control point by providing an announcement. In the preferred embodiment, the announcement provides the subscriber with an unobtrusive indication (or "clue") that a password is to be entered to have the communication routed to the directory number. To other unauthorized callers, the announcement is preferably unobtrusive or transparent as just another telecommunications announcement so that these unauthorized callers are not made aware of the bypass feature by the announcement.

After the announcement, the switch preferably receives the password from the subscriber through the entry of dual tone multifrequency (DTMF) digits. The entry of the password indicates a desire to bypass the redirection service for the communication. The switch responds to the entry of the password by providing the password to the service control point. The service control point responds to receipt of the password by checking the validity of the password in the database of subscriber information. If the service control point finds the password invalid, then the service control point provides the switch with redirection routing instructions to route the communication pursuant to the subscriber preselected redirection scheme. The switch responds to the redirection routing instructions by routing the communication pursuant to the subscriber preselected redirection scheme. If the service control point finds the password is valid, then the service control point provides the switch with conventional routing instructions to route the communication to the directory number. The switch responds to the conventional routing instructions by routing the communication to the directory number.

Advantageously, the present invention provides the capability of singular activation of a redirection service without general activation of the service. In particular, the present invention provides the capability of checking or testing a network communication redirection service and/or the subscriber preselected redirection scheme by singular activation of the redirection service with respect to a particular communication. The present invention allows for the singular activation of a redirection service with no or very minimal disruption of the communication services of the subscriber. Further, the present invention provides the described capabilities in a manner that is relatively inexpensive, that does not require on-premises equipment, that is easy to use, and that is easy to maintain and service.

Therefore, it is an object of the present invention to provide an improved method and system for singular activation of a redirection service without general activation of the service.

That the present invention and the preferred embodiment thereof overcome the drawbacks set forth in the background and accomplish the objects of the invention set forth herein will become apparent from the detailed description of the preferred embodiment to follow.

DETAILED DESCRIPTION

Stated generally, the method and system of the present invention allow a network communication redirection service to be singularly activated with respect to a particular communication without generally activating the service for other communications. Advantageously, the singular activation (also referred to as "selective implementation") of the redirection service with respect to a particular communication allows the subscriber to test the redirection service and/or the subscriber preselected redirection scheme associated with the redirection service without disrupting the subscriber's other communications.

To demonstrate some of the advantages of the present invention, reference is made to the example mentioned above of a subscriber that has subscribed to a network communication redirection service such as the CRISISLINK service for redirection of communications in an emergency. The subscriber will have preselected a redirection scheme to be applied when communications to the subscriber's directory number or numbers are to be redirected. The subscriber will also have specified a calling line identification number associated with a particular calling line as the line that will be used by the subscriber when the subscriber desires singular activation of the redirection service. Thus, the subscriber is able to test its emergency redirection service by placing a call on the calling line associated with the specified calling line identification number and by directing the call to the directory number the subscriber has covered with the redirection services. In response to receiving the call, the present invention, as described in detail below, will redirect the call pursuant to the redirection scheme preselected by the subscriber. No other communications to the directory number will be affected. In this way, the subscriber may verify that the redirection scheme will suit the subscriber's purposes and that the redirection service will be implemented when needed, but without any disruption to the subscriber's communication traffic.

Stated more particularly with respect to the preferred method and system of the present invention, the present invention includes a switch which is operative to receive a communication in the intelligent switched telephone network. The communication is directed to the directory number to which the network communication redirection service has been applied by network elements such as the switch and a service control point. The switch reads the identification information associated with the communication and provides the identification information to a service control point that is functionally connected to the switch. In addition, the service control point includes a database of subscriber records (or "subscriber information") maintained by the network. The service control point reads the identification information for the presence of a directory number (also referred to as a "called party identification number"). The service control point searches for a matching entry to the directory number in the database of subscriber records. In response to finding the matching entry to the directory number, the service control point searches for a corresponding entry to the calling line identification number in the database of subscriber records. Upon finding a corresponding entry, in the preferred embodiment, the service control point, the service control point implements the network communication redirection service by providing the switch with redirection routing instructions to route the communication pursuant to the subscriber preselected redirection scheme. In response to receiving the redirection routing instructions, the switch routes the communication pursuant to the subscriber preselected redirection scheme. In response to failing to find the corresponding entry to the calling line identification number, the service control point provides the switch with conventional routing instructions so as to route the communication to the directory number. In response to receiving the conventional routing instructions, the switch routes the communication to the directory number.

DESCRIPTION OF THE PREFERRED ENVIRONMENT OF THE PREFERRED EMBODIMENT

Figure 1:
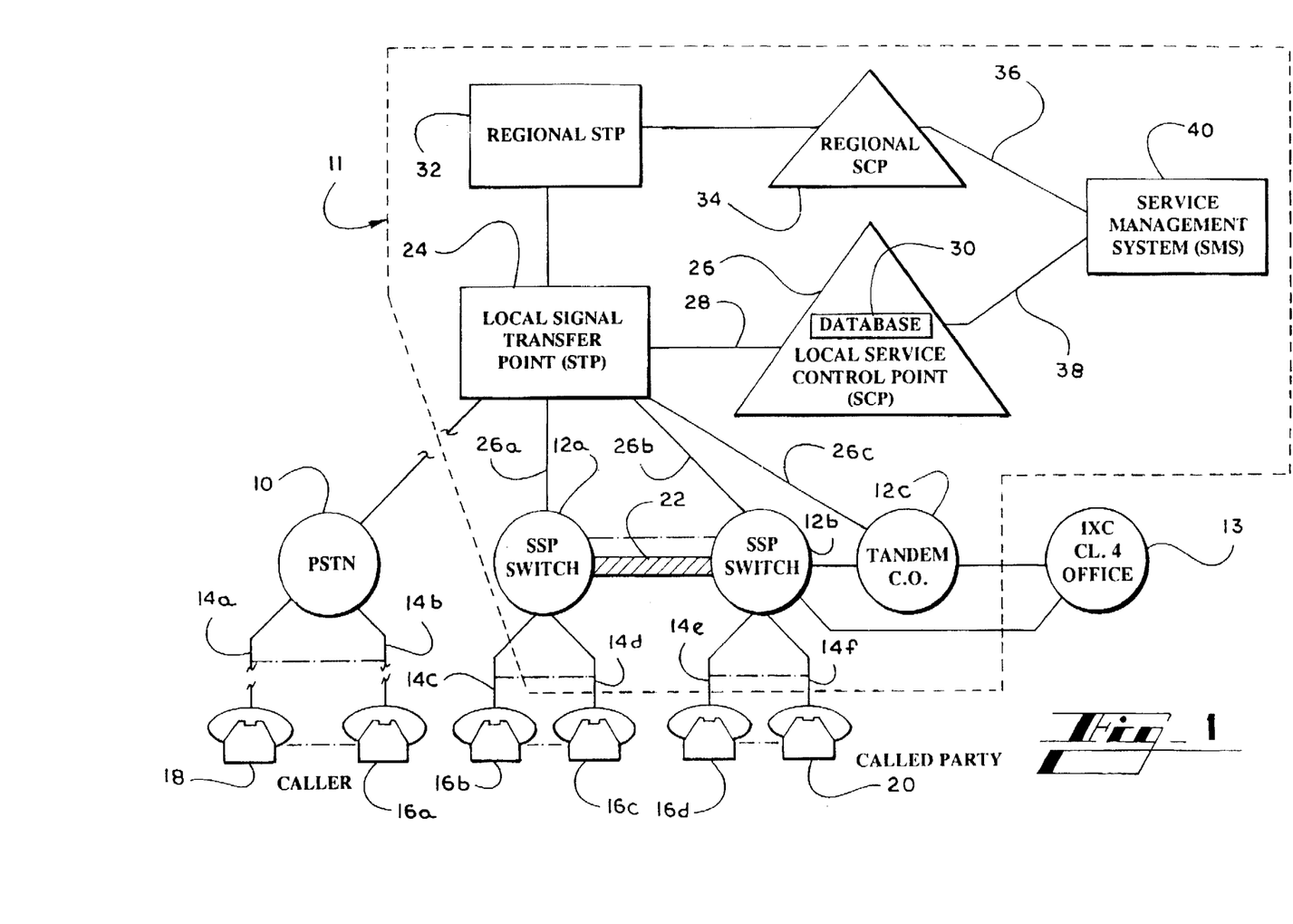
FIG. 1 is a block diagram illustrating the preferred environment of the preferred embodiment of the present invention.

Referring now to the drawings, in which like numerals indicate like elements throughout the several figures, FIG. 1 is a block diagram illustrating the public switched telephone network (PSTN) 10 and an illustrative portion 11 of the PSTN. In particular, the portion 11 of the PSTN illustrates a part of the Advanced Intelligent Network (AIN) of a typical local exchange carrier, which is the preferred environment of the preferred embodiment of the present invention.

The Advanced Intelligent Network comprises a plurality of central offices, which are indicated as SSP switches 12a, 12b in FIG. 1. "SSP" is an acronym for service switching point. A service switching point is a switch, (specifically a Class 5 central office) and the terms are used interchangeably herein. In the preferred embodiment, the service switching point is equipped with AIN software release 0.1 or higher release. For more information, see Bellcore Specification TR-NWT-001284 Switching Systems Generic Requirements for AIN 0.1, which is incorporated herein by reference. The dashed lines between the switches 12a, 12b indicate that the number of switches is arbitrary. The Advanced Intelligent Network also comprises non-SSP central office switches, but such non-SSP switches are not shown in FIG. 1. The difference between an SSP and a non-SSP switch is that an SSP includes intelligent network functionality including appropriate hardware and software so that, when a set of predetermined conditions are detected, the SSP initiates a trigger for a predetermined state of a call on a subscriber's directory number, generates the trigger as an appropriate message to be sent out over the SS7 network, and suspends handling of a call until the SSP receives a reply from the network instructing the SSP to take certain action. If the SSP receives no instructions within a certain amount of time, the SSP has a default task to execute with respect to the predetermined condition. A non-SSP switch is an electronic switch that can generate certain rudimentary data packets and provide them over the network, but the non-SSP switch must rely on other equipment to provide subscriber lines connected to such a non-SSP switch with more complex features and services available in the Advanced Intelligent Network.

As is well known to those skilled in the art, the Advanced Intelligent Network also includes a tandem switch (also referred to as a "tandem central office") which interconnects local offices, SSPs and interexchange carriers (IXCs). In particular, if an interoffice trunk or an IXC trunk to an SSP becomes unavailable or overloaded, an alternate routing plan can go into effect so that calls are processed through the tandem attempting to reach the SSP. As alternate routing paths, the tandem switches include the same equipment and are provided with the same information available to their respective SSPs. In the case of a problem with accessing a particular SSP, the SSP's alternate route through the tandem may be taken until the problem is resolved. FIG. 1 illustrates the tandem switch 12c that is associated as will be well known to those skilled in the art with SSP 12b and with IXC 13 (which is a Class 4 office). The present invention preferably operates with the deployment of either the SSP, such as SSP 12b, or its tandem, such as tandem 12c.

As further illustrated in FIG. 1, SSP switches 12a, 12b have a plurality of subscriber lines commonly designated as 14 (14a, 14b, 14c, and 14d, 14e, and 14f) connected thereto. Typically, the number of subscriber lines serviced by each switch is on the order of 10,000 to 70,000 lines. Each subscriber line 14 is connected to a piece of terminating equipment including a plurality of telephones commonly designated as 16 (16a, 16b, 16c and 16d). Although telephones are illustrated as the pieces of terminating equipment in FIG. 1, those skilled in the art will understand that such pieces include other telecommunication devices such as facsimile machines, computers, modems, etc. In particular, the telephones 16a, 18 are shown as connected by broken subscriber lines 14a, 14b to PSTN 10 to indicate that these subscriber lines and pieces of terminating equipment represent lines and equipment that exist in a conventional manner within the network and that operate with the present invention, but that are not necessarily connected to SSPs 12a, 12b. In addition, one of the illustrated telephones 18 is designated as corresponding to the calling party, (also referred to as "caller" or as "source"). Another of the illustrated telephones 20 is designated as corresponding to the called party. Both of these designations will become useful in the description of the preferred embodiment as set forth below. By way of example, FIG. 1 illustrates that the telephone of calling party 18 is connected via subscriber line 14a to PSTN 10, and the telephone of called party 20 is connected via subscriber line 14f to SSP 12b.

Pursuant to the preferred embodiment, each piece of terminating equipment in an intelligent switched network is assigned a ten digit directory number. In the description of the present invention, the term "directory number" is used in its generally understood meaning to be the number which is dialed or input by a caller or source to reach a piece of terminating equipment associated with the dialed directory number. A directory number is commonly referred to as a telephone number. It should be noted that a piece of terminating equipment's directory number is not necessarily unique, but may be shared by a group of pieces of terminating equipment. For example, a household may include several different telephones, a facsimile machine and a computer with a modem. It is likely that the several telephones in the home will all be assigned the same directory number so that a call that terminates at the home may be conveniently answered at any of the telephones in the home. However, it is likely that the facsimile machine and the computer will each have a different directory number from the directory number assigned to the home telephones. These numbers may be different because the telecommunication services provided to the facsimile machine and to the computer may be billed differently from the telephones, or be serviced differently from the telephones, or may be set up so that their use does not interfere with the telephones.

The method and system of the present invention make use of the calling line number (also referred to as the "calling line identification number") specified by the subscriber as part of the plan for implementation of the present invention in connection with redirection services. As used herein, the term "calling line number" or "calling line identification number" refers to the number associated with a particular calling line used by the subscriber to initiate singular activation of redirection services with respect to a particular communication.

Referring again to FIG. 1, switches 12a, 12b are interconnected by a plurality of trunk circuits indicated as 22 in FIG. 1. These are the voice path trunks that interconnect the central office switches to connect communications. The term "communication" is used herein to include all messages or calls that may be exchanged between caller and called party in the network illustrated in FIG. 1. It should be understood that central office trunking in a typical urban environment is not limited to a daisy chain arrangement implied by FIG. 1. In other words, in a typical network, trunk circuits exist between central office switch 12a or 12b and the central office switch(es) (not shown) servicing the pieces of terminating equipment 16a, 18.

Each of the SSPs in the network including switches 12a, 12b and tandem 12c is connected to a local signal transfer point (STP) 24 via respective data links 26a, 26b and 26c. Currently, these data links are 56 kilobit per second bidirectional data links employing a signaling protocol referred to as Signaling System 7 (SS7), which is well known to those skilled in the art. STP 24 is simply a multi-port high speed packet switch that is programmed to respond to the routing information in the SS7 protocol, and route the packet to its destination. STPs are conventionally installed in redundant pairs (like the tandem central offices) with accompanying data links. The redundant devices are not illustrated for sake of simplicity in the drawings.

Much of the intelligence of the Advanced Intelligent Network resides in the local service control point (SCP) 26 that is connected to STP 24 over SS7 data link 28. As is known to those skilled in the art, SCPs are physically implemented by relatively powerful fault tolerant computers. Typical implementation devices include the Star Servicer FT Model 3200 or the Star Server FT Model 3300, both sold by American Telephone & Telegraph Company. Typically, SCPs are provided in redundant pairs. Among the functions performed by SCPs is the maintenance of network databases which are used in providing services. In addition, SCPs include databases such as the illustrated subscriber information database 30 that identify particular service subscribers and the services to be accorded to these subscribers.

In order to keep the processing of data and calls as simple as possible, a relatively small set of triggers is defined at the switches for each call. A trigger in the Advanced Intelligent Network is an event associated with a particular subscriber line that generates a packet to be sent to an SCP. The trigger causes the SCP to query its database to determine which customized calling feature or enhanced service should be implemented for this particular call. The results of the database inquiry are sent back to the switch from SCP 26 through STP 24. The return packet includes instructions to the switch as to how to process the call. The instruction may be to take some special action as a result of a customized calling service or enhanced feature. In response to receiving the latter type message, the switch moves through its call states, collects the called digits, and generates further packets that are used to set up and route the call. Similar devices for routing calls among various local exchange carriers are provided by regional STP 32 and regional SCP 34.

Both regional SCP 34 and local SCP 30 are connected via respective data links 36 and 38 to a service management system (SMS) 40. The SMS 40 also is implemented by a large general purpose computer and interfaces to business offices of the local exchange carrier and interexchange carriers. The SMS downloads information to the databases of SCPs 30 and 34 when subscribers set up or modify their ensemble of AIN services. Similarly, SMS 40 downloads on a non-realtime basis, billing information that is needed in order to appropriately invoice subscribers for the services provided.

General Operation of the Preferred Embodiment in the Preferred Environment

The preferred embodiment of the present invention operates in the above described environment as illustrated in FIG. 1, and further, operates in connection with the application of network communication redirection services to a selected directory number. In particular, the preferred embodiment operates in connection with the CRISISLINK redirection service generally described in the background and the above referenced related patent application. Further information about the CRISISLINK redirection service may be obtained from the document entitled "CRISISLINK Service, Questions & Answers, 'Protecting Your Connection to the World When You Need It The Most', BellSouth Business Systems, Atlanta, Ga. 1995," which is incorporated herein by reference.

To provide a detailed explanation of the present invention, it will be understood that a subscriber has subscribed to a redirection service. Pursuant to this service, in certain specified situations, all communications directed to a particular previously selected directory number or numbers will be handled pursuant to a redirection scheme or plan preselected by the subscriber. In accordance with the present invention, the subscriber will also have specified a calling line identification number associated with a particular calling line as the line that will be used by the subscriber when the subscriber desires singular activation of the redirection service.

When the subscriber desires to activate the redirection service for a particular communication only, such as for testing purposes of the redirection service or of the redirection scheme, the subscriber places a call from the calling line having the specified calling line number. The call is directed to the directory number (or one of them if there is more than one) to which redirection services would generally be applied in the relevant situations. The communication is directed through use of the directory number (also referred to as a "called party number" or "dialed directory number") such as a telephone number entered by the subscriber (henceforth referred to as the calling party 18) and associated with the communication in a manner well known to those of ordinary skill in the art. In the preferred embodiment, the call is received at a service switching point. Preferably, the communication is routed from the receiving SSP through the Advanced Intelligent Network on the basis of the directory number until the communication reaches a service switching point 12b, which serves communications directed to that directory number.

Associated with the communication in a conventional manner is identification information. The identification information will generally include the calling line identification number associated with the calling line or the telephone number associated with the telephone where the communication was initiated or placed. The identification information also will include the directory number such as the telephone number associated with the telephone of the called party. This identification information is read in a manner well known to the art by elements of the Advanced Intelligent Network, including service switching points, as the communication is routed. With respect to the present invention, the service switching point that serves the "dialed" directory number preferably reads the identification information associated with the communication. The presence of a public office dialing plan (PODP) trigger or a terminating attempt trigger (TAT) on the directory number invokes a query in a conventional manner and the service switching point checks with its associated service control point for instructions. For example, as illustrated in FIG. 1, if calling party 18 initiates a communication directed to the directory number associated with called party 20, the communication will reach service switching point 12b, which then reads the identification information associated with the communication. After reading the information, the service switching point 12b provides the service control point 26 with the identification information. The inclusion and reading of information to trigger special handling of a communication is well known to those skilled in the art. Preferably, switching point 12b provides service control point 26 via signal transfer point 24 with the identification information associated with the communication.

Service control point 26 maintains a list of directory numbers having special services. In the preferred embodiment, the service control point 26 comprises subscriber records (or subscriber information) database 30 including entries of directory numbers (also referred to as "directory number subscriptions") associated with called party lines accorded special treatment such as redirection services. Generally, service control point 26 compares the identification information received from switching point 12b with entries in the database 30 in order to determine whether the communication is to receive special services. In particular, the called party (also referred to as "directory number") associated with the communication as part of the identification information is used to determine subscriptions. The service control point 24 compares this directory number with entries in the database 30 in order to determine whether the directory number has a valid subscription for special services.

If a matching entry for special services is not found, the service switching point 12b provides the communication with default treatment by routing the communication without special services. If a matching entry for special services is found, the service control point 26 then traverses the service logic looking for a corresponding entry to match the initial table entry for calling party identification. In other words, the service control point searches for a corresponding entry to the calling line identification number. If found, the subscriber's preselected redirection scheme is applied to the communication, i.e., the redirection service is singularly activated with respect to the communication. The service control point 26 provides the service switching point 12b with the appropriate instructions to route the communication pursuant to the subscriber's preselected redirection scheme. The switch 12b responds by routing the communication accordingly. If a corresponding entry is not found, the service switching point 12b provides the communication with default treatment by routing the communication without special services.

As explained in the summary, the present invention may be combined with a redirection service having a test call capability feature available to subscribers. Such a feature allows a subscriber to bypass a redirection service that has been applied to a directory number and to be connected to the directory number. When implemented with a test call capability feature, the method and system of the present invention do not differ from the descriptions above. However, when the present invention is combined with the test call capability feature, the combination results in the following steps and system described below following upon the steps and system of the present invention described above. The test call capability feature is described in further detail in the above referenced patent application, Ser. No. 08/511,743, filed Aug. 7, 1995, entitled "A Method and System to Bypass Alternate Routing Plans Applied to Directory Numbers", pages 14–29, commonly assigned to the assignee of the present application, and incorporated herein by reference.

If the service control point 26 fails to find a corresponding entry to the calling line identification number, then the preferred embodiment generally checks whether the redirection service for the directory number has been turned on. This step is executed by the service control point 26 in a manner well known to those skilled in the art for checking whether a particular service has been implemented with respect to a particular directory number. If the network communication redirection service has not been implemented, then the service control point 26 provides the switch 12b with conventional routing instructions to route the communication to the directory number. The switch 12b responds to the conventional routing instructions by routing the communication to the directory number.

If the service control point 26 finds that the network communication redirection service has been activated, then the service control point 26 preferably checks whether the subscriber has the test call capability feature. In particular, the service control point 26 checks the subscriber information database 30 for the presence of a bypass feature (also referred to as "test call capability"). The presence of the bypass feature indicates that the source of the communication is to be given an option of bypassing the redirection service and of having the communication routed to the directory number. If the bypass feature is not found, then the preferred embodiment of the present invention routes the communication pursuant to the redirection service.

If the bypass feature is found by the service control point 26, then the service control point preferably provides the service switching point 12b with password collection instructions. In the preferred embodiment, the password collection instructions instruct the service switching point to play an announcement, to wait a predetermined time interval for the entry of the password and to collect the password. Preferably, the announcement states: "One moment please". The preferred password is a four digit password that is entered by the source of the communication after the announcement during the predetermined time interval. The service switching point 12b collects the entered digits and provides them to the service control point 30. The service control point then checks the validity of the password in the database 30 of subscriber information. If the source fails to enter the password within the predetermined time interval, or if the service control point 26 finds the password invalid, then the preferred embodiment of the present invention routes the communication pursuant to the redirection service.

If the service control point 26 finds the password is valid, then the service control point 26 provides the service switching point 12b with routing instructions to route the communication to the directory number. The service switching point 12b responds to the routing instructions by routing the communication to the directory number.

Figure 2:
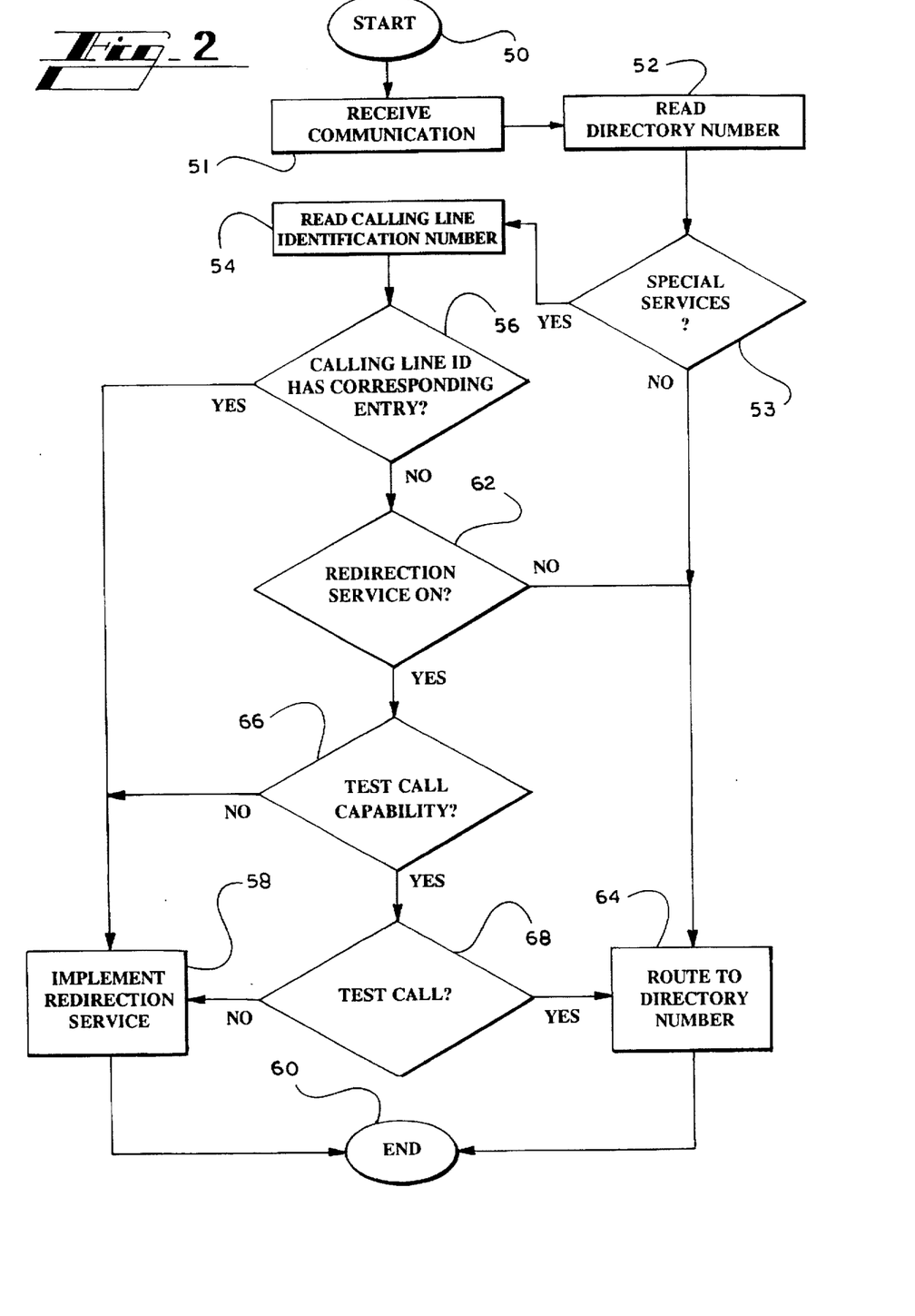
FIG. 2 is a flow chart illustrating the preferred general method of the preferred embodiment of the present invention.
Figure 3A:
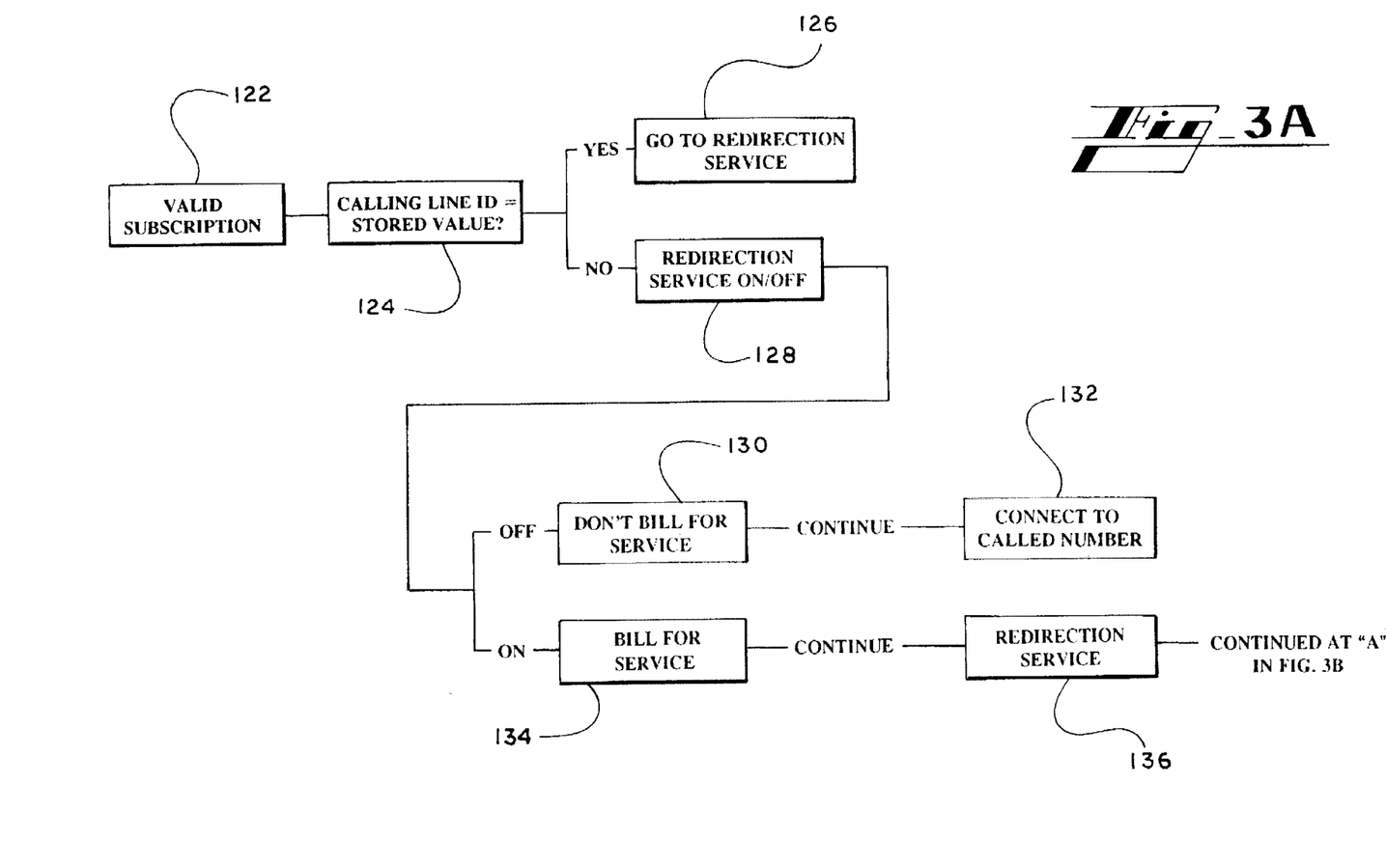
FIGS. 3A and 3B constitute a decision graph illustrating the preferred general method of the preferred embodiment of the present invention as it interfaces with a redirection service having a test call capability feature.
Figure 3B:
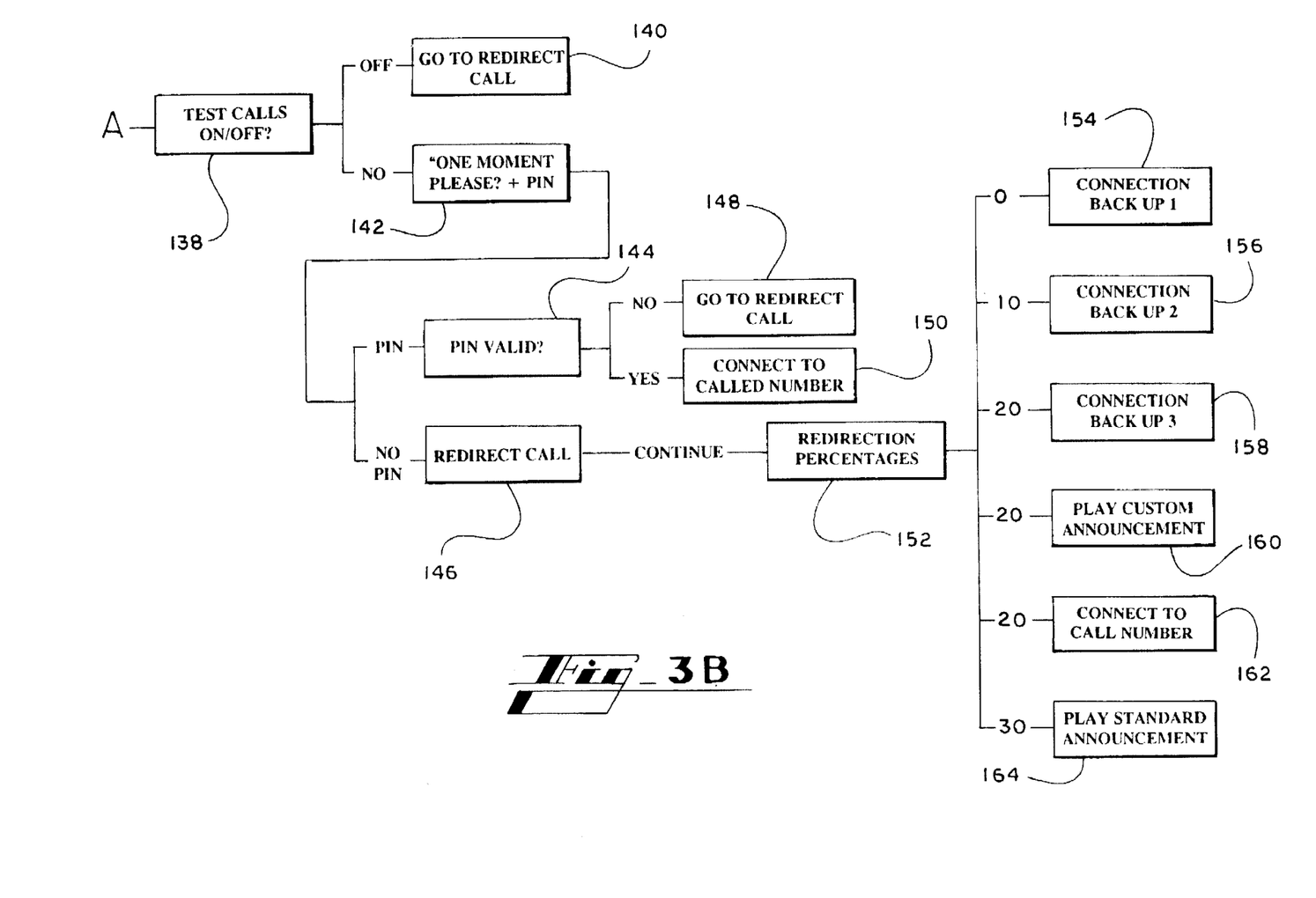

Description of the Preferred Embodiment Using a Flow Diagram and a Decision Graph The flow chart and decision graph of FIGS. 2 and 3A–3B provide a detailed description of the process steps executed by the preferred embodiment of the present invention. Using an analogy to electrical circuit diagrams, these figures are equivalent to a detailed schematic for an electrical circuit where the provision of the circuitry for electrical circuit blocks corresponds to provision of actual computer instructions for blocks of the flow chart. Thus, the coding of the process steps of these figures into instructions for suitable commercially available computers is a mere mechanical step for an engineer or other person skilled in the programming art.

FIG. 2 is entered at step 50, and in step 51, the present invention receives a communication from a source. The source may be a person or calling party such as the calling party 18 illustrated in FIG. 1, or the source may be a telecommunications device. For illustrative purposes, it will be assumed that the source is the subscriber (or a representative of the subscriber), who is referred to as the calling party 18. Preferably, the calling party uses any touch-tone telephone to dial in a directory number to direct the communication. The communication works its way through the network in a manner well known to those skilled in the art until it reaches the network device servicing the dialed directory number In step 52, the identification information associated with the communication is read in a conventional manner, and is checked for special handling instructions. The inclusion and reading of information to trigger special handling of a communication in the Advanced Intelligent Network is well known to those skilled in the art. In particular, the identification information associated with the communication includes the directory number to which the communication is directed. In decision step 53, the present invention checks whether the directory number has a valid subscription for special services. If not, then in step 64 the present invention routes the communication to the directory number and proceeds to end in step 60. If the directory number has a valid subscription for special services, then in step 54 the present invention reads the calling line identification number.

In step 56, the present invention checks whether the calling line identification number has a corresponding entry in the database of subscriber information maintained by the network. If a corresponding entry exists, this positive result indicates that the subscriber is using the calling line associated with the "read" calling line identification number to instigate a singular activation of the redirection services for that call. In step 58, the present invention responds to the corresponding entry by activating the network communication redirection service for the communication by routing the communication pursuant to the subscriber preselected redirection scheme. The present invention then proceeds to end in step 60.

On the other hand, if there is no corresponding entry to the calling line identification information, then in step 62 the preferred embodiment of the present invention proceeds to check whether the redirection service has been implemented, i.e., turned-on. If not, then in step 64 the present invention routes the communication to the directory number dialed by the calling party, and proceeds to end in step 60. If the redirection service has been implemented, then in step 66 the present invention checks whether the special handling instructions include a bypass feature, also referred to as "test call capability". As explained above, the test call capability or bypass feature is a method and system that allows for the bypassing of the redirection service applied to the dialed directory number so that the communication may reach the dialed directory number, rather than a redirected number. If the test call capability determination in step 66 is negative, then in step 58 the present invention routes the communication in accordance with the redirection service, and proceeds to end in step 60.

If the test call capability determination in step 66 is positive, then in step 68 the preferred embodiment of the present invention executes a series of steps to determine whether the communication is a test call such that it should be routed to the dialed directory number. If the result of the check in step 68 is positive, then in step 64 the present invention routes the communication to the dialed directory number, and proceeds to end in step 60. However, if the result of the check in step 68 is negative, then in step 58 the present invention implements the redirection service pursuant to the subscriber preselected redirection scheme, and proceeds to end in step 60.

FIGS. 3A and 3B illustrate the general method of the preferred embodiment as it interfaces with the CRISISLINK service described in the background. As noted, the CRISISLINK service is offered by BellSouth Telecommunications, Inc. and the service operates on the Advanced Intelligent Network as described in FIG. 1. In the preferred embodiment, a decision graph is completed with information relevant to each subscriber and/or each directory number that is to be accorded CRISISLINK service, and in particular, that is to be accorded the capability of selectively implementing the redirection services for a particular communication. The decision graph for a particular subscriber is created and input by administrative personnel based on information provided by the subscriber. The decision graph is created and input in a conventional manner to interface with services provided to the subscriber and the directory number through the service management service (SMS) 40 that is described above in connection with the Advanced Intelligent Network in FIG. 1. Once the decision graph for a particular subscriber (or directory number) has been created and input at the SMS, the decision graph then is transferred to the local service control point (such as SCP 26) that services the service switching point that, in turn, services the directory number which is the subject of the decision graph. Typically, such decision graphs are stored by a service control point in a subscriber information database such as the database 30 illustrated in FIG. 1. When information is needed by the service control point to provide instructions for the processing of a communication, the service control point accesses the database and traverses the decision graph in a conventional manner.

Referring to FIGS. 3A and 3B, the illustrated decision graph begins at block 122, which is labeled as "valid subscription." As described above, the present invention has checked the directory number against subscriber records to determine that special services are to be applied with respect to the communication. At block 124, a check is made to determine whether the calling line identification number is equal to a stored value, i.e., whether the calling line identification number has a corresponding entry in the subscriber information database. If the calling line identification number is equal to a stored value, then in block 126 the present invention goes to the redirection service. In other words, redirection services are activated for the communication. On the other hand, if the calling line identification number is not equal to a stored value, then in block 128 a determination is made as to whether redirection services are "ON" or "OFF".

If the redirection service is "OFF", i.e., all communications are to be routed to the directory number, then in block 130 the present invention includes an instruction to not bill for the service and in block 132 connects the communication to the called number. If the redirection service is "ON", i.e., all communications are to be redirected pursuant to the subscriber preselected redirection scheme, then in block 134 the present invention includes an instruction to bill for the service and in block 136 the present invention proceeds to implement the redirection services as specified by the following blocks in the decision graph.

As illustrated in FIGS. 3A and 3B, in block 138 a check is made as to whether the test call capability for communications is "ON" or "OFF". If the test call capability is "OFF", then in block 140 the redirection service is applied pursuant to the subscriber preselected redirection scheme as specified in blocks 154, 156, 158, 160, 162, 164 and 166 and described below. If the test call capability is "ON", as explained above, the preferred embodiment in block 142 provides the source of the communication with an opportunity to invoke test call capability by the input of a valid PIN number. If the subscriber enters a PIN number, then in block 144, a comparison is made to determine whether the PIN is valid. If the PIN is invalid, then pursuant to block 148, the communication is provided with redirection services as specified in blocks 154, 156, 158, 160, 162, 164 and 166 and described below. If the PIN is valid, then pursuant to block 150, the communication is routed to the directory number. If no PIN is received, then pursuant to block 146, the communication is provided with redirection services. The particular type of redirection service provided to the communication depends on the selections made by the subscriber with respect to backup numbers, announcements, etc. In the preferred CRISISLINK service, the subscriber may select up to three different backup numbers for redirection of the communication. See blocks 154, 156 and 158. In addition, the subscriber may select the option of redirecting the communication to a custom announcement. See block 160. Further, the subscriber may select the option of routing the communication to the directory number. See block 162. Finally, the subscriber may select the option of redirecting the communication to a network announcement. See block 164. Of course, the communication will be redirected based on only one of the options, but the probability of which of the options the communication receives as a redirection service depends on the percentages the subscriber ascribes to each option as indicated by block 152 entitled "redirection percentage" and the following blocks 154, 156, 158, 160, 162 and 164.

As illustrated in FIGS. 3A and 3B, the subscriber has chosen to use only five options in the redirection services: connection to backup #2 (block 156); connection to backup #3 (block 158); play custom announcement (block 160); connect to called number (block 162); or play standard announcement (block 164). Also, the subscriber has chosen to split the redirection of communications directed to the directory number based on the following percentages: 10% to connection to back up 2 (block 156); 20% to connection to back up 3 (block 158); 20% to play custom announcement (block 160); 20% to connect to called number (block 162); and 30% to play standard announcement (block 164).

Advantageously, the present invention provides the capability of singular activation of a redirection service without general activation of the service. In particular, the present invention provides the capability of checking or testing a network communication redirection service and/or the subscriber preselected redirection scheme by singular activation of the redirection service with respect to a particular communication. The present invention allows for the singular activation of a redirection service with no or very minimal disruption of the communication services of the subscriber. Further, the present invention provides the described capabilities in a manner that is relatively inexpensive, that does not require on-premises equipment, that is easy to use, and that is easy to maintain and service.

While this invention has been described in detail with particular reference to the preferred embodiments thereof, it will be understood that variations and modifications can be effected within the spirit and scope of the invention as described hereinabove and as defined in the appended claims. It can be seen that this invention could be applied to temporarily or singularly activate any dormant service associated with a subscriber's directory number.

We claim:

1. In an intelligent switched telephone network including a switch and a service control point, said service control point being functionally connected to said switch and said service control point including a database of subscriber information, a method for a singular activation of a network communication redirection service for redirecting a communication directed to a directory number pursuant to a subscriber preselected redirection scheme, comprising the steps of:

A. setting up a network communication redirection service with respect to a directory number associated with a subscriber line such that,
1. said network communication redirection service has an active state or an inactive state,
2. when said network communication redirection service is in said active state, then communications directed to said directory number are redirected pursuant to said subscriber preselected redirection scheme,
3. when said network communication redirection service is in said inactive state, then said communications directed to said directory number are routed to said directory number,
4. also when said network communication redirection service is in said inactive state, providing a singular activation of said network communication redirection service in said inactive state in response to a request for said singular activation, said singular activation providing for the redirection of a communication pursuant to said subscriber preselected redirection scheme, and
5. a calling line identification number with respect to said directory number serves as an indicator of said request for said singular activation;

B. placing said network communication redirection service in said inactive state;

C. receiving, at said switch, said communication from a calling line having said calling line identification number and said communication being directed to said directory number having said network communication redirection service in said inactive state;

D. causing said switch to read identification information associated with said communication and to provide said identification information to said service control point, said identification information including said directory number and said calling line identification number;

E. causing said service control point
1. to read said directory number and said calling line identification number included in said identification information,
2. to search for a matching entry to said directory number in said database of subscriber information,
3. in response to finding said matching entry to said directory number, to search for a corresponding entry to said calling line identification number in said database,
4 in response to finding said corresponding entry to said calling line identification number, to implement said singular activation of said network communication redirection service by providing said switch with redirection routing instructions to route said communication pursuant to said subscriber preselected redirection scheme; and F. causing said switch to respond to said redirection routing instructions by routing said communication pursuant to said subscriber preselected redirection scheme.

2. The method of claim 1, further comprising the steps of:
in response to failing to find said corresponding entry to said calling line identification number, causing said service control point to provide said switch with conventional routing instructions so as to route said communication to said directory number; and
causing said switch to respond to said conventional routing instructions by routing said communication to said directory number.

3. In an intelligent switched telephone network including a switch and a service control point, said service control point being functionally connected to said switch and said service control point including a database of subscriber information, a method for using a bypass feature for directing a communication to a directory number when the singular activation of a network communication redirection service is unavailable, the method comprising the steps of:

A. causing said switch to read identification information associated with said communication and to provide said identification information to said service control point, said identification information including said directory number and a calling line identification number;

B. causing said service control point
  1. to read said directory number and said calling line identification number included in said identification information,
  2. to search for a matching entry to said directory number in said database of subscriber information,
  3. in response to finding said matching entry to said directory number, to search for a corresponding entry to said calling line identification number in said database,
  4. in response to failing to find said corresponding entry to said calling line identification number, to fail to implement said singular activation of said network communication redirection service, and to check whether said network communication redirection service has been implemented,
  5. in response to finding that said network communication redirection service has been implemented,
    a. to check said database of subscriber information for a bypass feature, said bypass feature indicating the availability of an option of bypassing said network communication redirection service and having said communication routed to said directory number, and
    b. in response to finding said bypass feature, to provide said switch with password collection instructions;

C. causing said switch, in response to receiving said password collection instructions, to provide an opportunity for the entry of a password, said entry of said password indicating a desire to bypass said network communication redirection service for said communication;

D. receiving said password;

E. causing said switch, in response to receiving said password, to provide said password to said service control point;

F. causing said service control point, in response to receipt of said password, to check the validity of said password in said database of subscriber information;

G. causing said service control point, in response to finding said password to be valid, to provide said switch with conventional routing instructions to route said communication to said directory number; and H. causing said switch to respond to said conventional routing instructions by routing said communication to said directory number.

4. The method of claim 3, further comprising the steps of:
in response to failing to find said bypass feature, causing said service control point to provide said switch with redirection routing instructions to route said communication pursuant to a subscriber preselected redirection scheme; and
causing said switch to respond to said redirection routing instructions by routing said communication pursuant to said subscriber preselected redirection scheme.

5. The method of claim 3, further comprising the steps of:
causing said service control point, in response to finding said password to be invalid, to provide said switch with redirection routing instructions to route said communication pursuant to a subscriber preselected redirection scheme; and
causing said switch to respond to said redirection routing instructions by routing said communication pursuant to said subscriber preselected redirection scheme.

6. In an intelligent switched telephone network, a method for a singular activation of a network communication redirection service for redirecting a communication directed to a directory number pursuant to a subscriber preselected redirection scheme without generally activating said network communication redirection service for other communications, comprising the steps of:

A. setting up a network communication redirection service with respect to a directory number associated with a subscriber line such that,
  1. said network communication redirection service has an active state or an inactive state,
  2. when said network communication redirection service is in said active state, then communications directed to said directory number are redirected pursuant to said subscriber preselected redirection scheme,
  3. when said network communication redirection service is in said inactive state, then said communications directed to said directory number are routed to said directory number,
  4. also when said network communications redirection service is in said inactive state, providing a singular activation of said network communication redirection service in said inactive state in response to a request for said singular activation, said singular activation providing for the redirection of a communication pursuant to said subscriber preselected redirection scheme, and
  5. a calling line identification number with respect to said directory number serves as an indicator of said request for said singular activation;

B. placing said network communication redirection service in said inactive state;

C. receiving, at said switch, said communication from a calling line having said calling line identification number and said communication being directed to said directory number having said network communication redirection service in said inactive state;

D. reading said directory number and said calling line identification number in said identification information associated with said communication;

E. searching for a corresponding entry to said calling line identification number in a database of subscriber information maintained by said network, said corresponding entry indicating a request for said singular activation of said network communication redirection service; and F. in response to finding said corresponding entry to said calling line identification number, implementing a singular activation of said network communication redirection service only for said communication by routing said communication pursuant to said subscriber preselected redirection scheme.

7. The method of claim 6, further comprising the step of:
in response to failing to find said corresponding entry to said calling line identification number, routing said communication to said directory number.

8. In an intelligent switched telephone network wherein a network communication redirection service is selectively activated with respect to all communications directed to a directory number to direct said communications pursuant to a subscriber preselected redirection scheme, a system for a singular activation of said network communication redirection service for a communication without generally activating said network communication redirection service for other communications, comprising:

A. a service control point functionally connected to a switch and having a database of subscriber information maintained by said network;
B. said database including information with respect to the set up of a network communication redirection service with respect to a directory number associated with a subscriber line,
  1. said network communication redirection service having an active state or an inactive state,
  2. when said network communication redirection service is in said active state, then communications directed to said directory number are redirected pursuant to said subscriber preselected redirection scheme,
  3. when said network communication redirection service is in said inactive state, then said communications directed to said directory number are routed to said directory number,
  4. said network communication redirection service providing for a singular activation of said network communication redirection service in said inactive state in response to a request for said singular activation, said singular activation providing for the redirection of a communication from said directory number and pursuant to said subscriber preselected redirection scheme,
  5. said network communication redirection service including a calling line identification number with respect to said directory number to serve as an indicator of said request for said singular activation, and
  6. said network communication redirection service being in said inactive state unless said network communication redirection service has been implemented into said active state;
C. said switch being operative to receive said communication in said intelligent switched telephone network from a calling line having said calling line identification number and said communication being directed to said directory number having said directory number having said network communication redirection service in said inactive state;
D. said switch being operative to read identification information associated with said communication and being responsive to said identification information to provide said identification information to a service control point, said identification information including said directory number and a calling line identification number;
E. said service control point being responsive to said identification information
  1. to read said directory number and said calling line identification number included in said identification information,
  2. to search for a matching entry to said directory number in said database of subscriber information,
  3. in response to finding said matching entry to said directory number, to search for a corresponding entry to said calling line identification number in said database, said corresponding entry indicating a request for said singular activation of said network communication redirection service, and
  4. in response to finding said corresponding entry to said calling line identification number, to implement said singular activation of said network communication redirection service for said communication by providing said switch with redirection routing instructions to route said communication pursuant to a subscriber preselected redirection scheme; and
  5. said switch being responsive to said redirection routing instructions to route said communication pursuant to said subscriber preselected redirection scheme.

9. The system of claim 8, wherein said service control point is responsive to failing to find said corresponding entry to said calling line identification number, the lack of said corresponding entry indicating the lack of a request for said singular activation of said network redirection service, by providing said switch with conventional routing instructions to route said communication to said directory number; and
  wherein said switch is responsive to said conventional routing instructions by routing said communication to said directory number.

10. In an intelligent switched telephone network including a switch and a service control point, said service control point being functionally connected to said switch and said service control point including a database of subscriber information, a method for using a bypass feature for directing a communication to a directory number when the singular activation of a network communication redirection service is unavailable, comprising the steps of:
A. causing said switch to read identification information associated with said communication and to provide said identification information to said service control point, said identification information including said directory number and a calling line identification number;
B. causing said service control point
  1. to read said directory number and said calling line identification number included in said identification information,
  2. to search for a matching entry to said directory number in said database of subscriber information to determine whether the communication is to receive special services,
  3. in response to finding said matching entry to said directory number, to search for a corresponding entry to said calling line identification number in said database,
  4. in response to finding said corresponding entry to said calling line identification number, to implement said network communication redirection service by providing said switch with redirection routing instructions to route said communication pursuant to a subscriber preselected redirection scheme; and
C. causing said switch to respond to said redirection routing instructions by routing said communication pursuant to said subscriber preselected redirection scheme; and
D. causing said service control point, in response to failing to find said corresponding entry to said calling line identification number,
  1. to check whether said network communication redirection service has been implemented, and
  2. in response to finding that said network communication redirection service has been implemented, to check said database of subscriber information for a bypass feature, said bypass feature indicating the availability of an option of bypassing said network communication redirection service and having said communication routed to said directory number.

11. A method for singular activation of a network communication redirection service, comprising the steps of:
A. provisioning a directory number with a network communication redirection service such that when said network communication redirection service is in an active state, then all communications directed to said directory number are redirected pursuant to a subscriber preselected redirection scheme, and that when said network communication redirection service is in an inactive state, then said all communications directed to said directory number are routed to said directory number unless a request for a singular activation of said network communication redirection service is indicated in association with a communication directed to said directory number;

B. placing said network communication redirection service in said inactive state;

C. receiving said request for said singular activation of said network communication redirection service in association with said communication directed to said directory number by receiving said communication directed to said directory number and said communication having a calling line identification number that has a corresponding entry in a database of subscriber information; and D. in response to said request, providing said singular activation of said network communication redirection service with respect to said communication only by routing said communication pursuant to said subscriber preselected redirection scheme and without changing said network communication redirection service from said inactive state.

E. whereby a subscriber may check the operation of said network communication redirection service with said communication having said calling line identification number without generally activating said network communication redirection service for other communications.

* * * * *